United States Patent

[11] 3,627,643

| [72] | Inventors | Tibor Sipos<br>Murray Hill, N.J.;<br>Frederick William Viebrock, Staten Island, N.Y. |
|---|---|---|
| [21] | Appl. No. | 16,553 |
| [22] | Filed | Mar. 4, 1970 |
| [45] | Patented | Dec. 14, 1971 |
| [73] | Assignee | Baxter Laboratories Inc.<br>Morton Grove, Ill. |

[54] HIGH-STRENGTH DEXTRANASE AND PROCESS OF PREPARATION
14 Claims, No Drawings

[52] U.S. Cl........................................ 195/66, 195/62
[51] Int. Cl........................................ C07g 7/028
[50] Field of Search........................ 195/62, 66, 31 P

[56] References Cited
UNITED STATES PATENTS

| 2,716,084 | 8/1955 | Whiteside et al. | 195/66 R |
| 2,716,237 | 8/1955 | Whiteside et al. | 195/31 P |
| 2,742,399 | 4/1956 | Tsuchiya et al. | 195/31 P |
| 3,102,113 | 8/1963 | Raper et al. | 195/66 R |

*Primary Examiner*—Alvin E. Tanenholtz
*Attorneys*—Walter C. Kehm and W. Garrettson Ellis ABSTRACT: A novel high-strength dextranase preparation is formed by combining an impure liquid dextranase-containing mixture with clay to adsorb dextranase, separating the clay from the liquid mixture, removing the dextranase from the clay in a wash solution, combining the wash solution with an insoluble carbohydrate anionic exchange material having tertiary amine or quaternary ammonium active groups to reabsorb the dextranase, separating the anionic exchange material from the wash solution, and eluting dextranase from said material.

HIGH-STRENGTH DEXTRANASE AND PROCESS OF PREPARATION

BACKGROUND OF THE INVENTION

Dextranase is an enzyme derived from micro-organisms such as *Penicillium funiculosum, Penicillium lilacinum, Bacillus megatherium, Aspergillus wentii, Lactobacillus bifidus*, and others. The enzyme, which decomposes dextran, is useful in the field of dentistry and dental preparations for destroying or preventing the formation of mucin plaque on the teeth, to reduce dental caries and diseases of the gum which are associated with the presence of plaque. The enzyme is also used for reducing the viscosity of dextran preparations intended for use as blood extenders or the like.

The previously available dextranase preparations have been of inconveniently low dextranase concentration, and the previously available methods for purifying and concentrating dextranase have been inconvenient and cumbersome.

Another problem is that although the process of ion exchange is recognized as a desirable means for purification of certain enzymes, the use of many ion exchange resins to purify dextranase is interfered with by the presence of substantial amounts of salt in the impure liquid starting materials for dextranase purification processes. These materials, being generally filtered culture broth preparations obtained by growing various micro-organisms, contain salt and other deleterious ingredients necessary for optimum growing conditions for the micro-organisms or produced during the growth. Furthermore, large amounts of pigment are generally found in the impure starting materials, which pigments can be absorbed along with the dextranase enzyme on ion exchange materials, requiring the need for large amounts of the expensive ion exchange material and resulting in an impure dextranase product.

The invention of this application relates to a new dextranase preparation of high concentration and purity, and to a new method for preparing such dextranase preparations. In accordance with this invention, a purification step is provided which converts culture filtrate starting materials into a partially purified dextranase solution, and the solution is then further purified using small amounts of a selected ion exchange material.

DESCRIPTION OF THE INVENTION

In the purification process of this invention, a dextranase-containing liquid mixture is adjusted to pH 3.5 to 6 and combined with clay to adsorb the dextranase present. The clay is then separated from the mixture, typically by filtering, and placed in an aqueous wash solution having a pH of 7 to 9 to cause the dextranase to desorb from the clay and enter into suspension in the wash solution. The wash solution is then separated from the clay, typically by filtering, and a cellulosic, anionic exchange material containing tertiary amine or quaternary ammonium active groups is added to the wash solution to reabsorb the dextranase. Following this, the anionic exchange material is separated from the wash solution, and then the dextranase is eluted from the anionic exchange material, for example, by the use of saline solution.

Following this, further purification steps can be applied as desired. For example, the dextranase can be precipitated by salt or solvent precipitation and filtered, and then the resulting purified enzyme can be further purified by dialysis to remove salts if desired.

In general, any clay may be used in the process of this invention. The clay minerals as a group contain hydrous aluminum silicate, and frequently contain additional substituents, e.g. iron oxide, or alkaline earth oxides such as magnesium or calcium oxide, incorporated in the crystal lattice. Examples of clay are fuller's earth, floridin, bentonite, attapulgite, or montmorillonite. In particular, kaolin has been found to provide highly satisfactory results in the process of this invention.

The amount of clay which should be added to the starting material can vary in accordance with the type of clay used and the concentration of dextranase in the impure liquid mixture comprising the starting material. Typically, at least 1 weight percent of clay, based on the weight of the impure liquid mixture, should be added. While there appears to be no critical upper limit to the amount of clay which can be added, generally no more than 5 weight percent of clay needs to be added in order to adsorb a maximum amount of the dextranase present.

The adsorption step on clay proceeds at a pH of about 3.5 to 6, which can generally be provided by adding an acidic material such as hydrochloric, acetic, or phosphoric acid to the impure liquid mixture. Preferably, the pH of the impure mixture is adjusted to about 4.5 to 5 and a temperature is maintained at about 65° to 75° F. prior to adding the clay. The reason for the above pH limitation is that dextranase generally has less stability at lower pH levels, while at higher pH levels, particularly pH levels above about 6, the clay loses its capacity to adsorb the dextranase.

Following the adsorption step, which generally takes from about 15 minutes to 3 hours, the clay is removed from the impure liquid mixture by filtering or other conventional techniques. By this process, large amounts of pigment and salt remain behind in the impure liquid, while the dextranase and certain impurities are adsorbed on the clay. The clay can then be sparged with water, which is preferably buffered at a pH of 4.5 to 5.0, to wash away nonadsorbed impurities. If desired, the impure liquid mixture and wash solution can be treated again with a second batch of clay to collect any remaining dextranase enzyme.

All of the resulting clay having adsorbed dextranase is then treated as described below:

The filtered and washed clay and adsorbed enzyme is eluted with an aqueous wash solution having a pH of 7 to 9, and preferably within a pH range of 8 to 9. The pH is kept at 9 or below because of the general instability of dextranase at higher pH levels. This elution causes the adsorbed dextranase to be removed from the clay and to pass into the wash solution. Conventional buffering solutions can be used to control the pH of the wash solution. The well-known "tris" buffer (tris-[hydroxymethyl]aminomethane) gives satisfactory pH control of the wash solution.

Generally, at least two parts by weight of wash solution are added for each part by weight of clay and adsorbed materials present. The elution step generally proceeds under ambient conditions for at least a half an hour with agitation to assist in the removal of unadsorbed material, and following this the mixture can be allowed to settle for generally at least 2 hours. Following this the supernatant can be decanted or filtered and centrifuged to obtain a clear enzyme solution. The elution step can be repeated on the clay if desired.

The clear enzyme solution is then treated with an insoluble carbohydrate anionic exchange material having tertiary amine or quarternary ammonium active groups. Such materials contain cellulose, or other appropriate carbohydrates having chemically bonded substituents either directly bonded to the carbohydrate or indirectly bonded through an intermediate linkage. The substituents contain tertiary amine nitrogen atoms (i.e. nitrogen atoms participating in three carbon-nitrogen bonds) or quarternary ammonium nitrogen atoms (i.e. nitrogen atoms participating in four carbon-nitrogen bonds and carrying a residual positive charge). These tertiary amine and quarternary ammonium active groups provide active anionic exchange sites which selectively absorb dextranase in preference to many of the impurities still present in the wash solution prepared above. Polyacrylamide gels can also be used in lieu of carbohydrate anionic exchange resins.

A preferred anionic exchange material is (diethylamino)ethyl-cellulose (known as DEAE cellulose), which contains tertiary alkyl amine active groups connected to an oxygen atom of the cellulose through alkylene groups. Another suitable anionic exchange material is anionic epichlorohydrin-triethanolamine cellulose (known as EC-TEOLA-cellulose which has tertiary alkanolamine active groups generally reacted with epichlorohydrin, and connected to the cellulose through alkylene groups). A third anionic exchange material is (diethylamino)ethyl-Sephadex, preferably used at low temperatures to avoid degradation. Sephadex is a known hydrophilic solid gel made from dextran. An example of a carbohydrate anionic exchange material having quarternary ammonium active groups is (triethylamino)ethyl cellulose (known as TEAE cellulose), suitably in the hydroxide form, or as a salt, such as the chloride, acetate, or borate forms prior to equilibration before use.

Other insoluble carbohydrate anionic exchange materials can be prepared with different tertiary amine or quarternary ammonium active groups having other substituents bonded to the nitrogen atoms (e.g. alkyl groups such as methyl, isopropyl, sec-butyl and n-octyl; or cycloalkyl olefinic groups such as cyclohexyl, vinyl, or allyl; or aryl-containing groups such as benzyl or 2-phenylpropyl). Also, different groups can be used to bridge the tertiary amine or quarternary ammonium nitrogen atoms to the carbohydrate group, e.g. hexamethylene,

—CH$_2$CH$_2$OCH$_2$CH$_2$—,

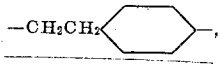

or the like. Active groups comprising nitrogen atoms bonded only to alkyl and alkylene groups are preferred, and the tertiary amine groups comprising nitrogen atoms bonded only to alkyl and alkylene groups are particularly preferred.

It is generally preferred to use a cellulosic anionic exchange material, but other exchange materials based upon Sephadex as described above or other insoluble dextrans and the like can also be used. The anionic exchange materials used herein are typically equilibrated in buffered aqueous solution prior to their use.

Generally, at least 1 weight percent of wet, equilibrated ion exchange material is added to the enzyme containing wash solution to absorb the dextranase, but larger amounts of up to 5 weight percent and above can be used if desired.

The anionic exchange material, after thorough mixing with the enzyme containing wash solution for at least one half hour or more, is then separated from the wash solution, typically by filtering. It is desirable to wash the filtered anionic exchange material with fresh wash solution of a pH of about 8 to 9 to remove nonabsorbed impurities.

The dextranase bonded to the anionic exchange material is then eluted, typically by resuspending the ion exchange material in a sodium chloride solution buffered to approximately pH 8 to 9. The mixture is typically then stirred for at least one half hour and filtered, the filter residue being washed with more buffered salt solution as required.

The resulting mixture is relatively pure, concentrated dextranase in saline solution.

The solution can be further purified and concentrated by precipitating the enzyme out with an appropriate solvent, or a salt such as ammonium sulfate, and collecting the enzyme precipitate by centrifugation or filtering. Following this, the concentrated enzyme can be further purified by dissolution in distilled water and removing of the salts by conventional dialysis. Certain remaining impurities may tend to be insoluble in distilled water, and these materials can thus be removed.

If desired, the pure enzyme solution can be freeze-dried or the like to obtain a solid product, or it can be stored as a solution.

The dried enzyme products produced by the process of this invention can have dextranase activities on the order of 2,500 up to 6,000 or more units per mg. (as defined below) compared with the conventional solid dextranase preparations which typically contain no more than about 100 dextranase activity units per mg. Thus the product of this invention has a greatly enhanced capability to degrade the dextranase found in the plaque on teeth and the like. For use, the compositions of this invention may be diluted with an inert material, e.g. a carbohydrate such as fructose, maltose or the like to yield a composition typically having an activity of at least 900 dextranase units per mg.

The following examples are provided for purposes of illustration of a preferred process and product of this invention.

EXAMPLE 1

A fermentation mash of *Penicillium funiculosum* is prepared by culturing that organism in an aqueous mixture containing 1 weight percent dextran and 1 to 2 weight percent of corn steep liquor at a temperature of about 30° C. for about 60 hours. The resulting product is mixed with 2 weight percent of "-Speedex" filter aid material, and filtered. The filter residue is washed with water and combined with the filtrate.

The filtrate is then adjusted to pH 4.5 by the addition of 50 percent phosphoric acid solution, and the temperature maintained at 65° to 75° F. Two weight percent of kaolin is added to the filtrate, and the mixture is stirred for one half hour.

Following this, 1 weight percent of "Speedex" filter aid material is added and the mixture again filtered. The filter cake is washed with water adjusted with phosphoric acid to a pH of 4.5. The filter residue, comprising kaolin which contains adsorbed dextranase, is preserved for further processing.

The liquid filtrate is then reprocessed in the manner described above with 2.5 weight percent kaolin, and the resulting filter cake combined with the previous kaolin filter cake.

The combined filter cakes are then resuspended in an aqueous solution of "Tris" buffer [tris-(hydroxymethyl)aminomethane] having a pH of 8.5. 2 and one-half kg. of the buffer solution are added for each 1 kg. of wet kaolin filter cake present. This is stirred for about 1 hour and then allowed to settle for about 4 hours. The supernatant is then decanted, and centrifuged to remove fine particles and to provide a clear solution containing the dextranase enzyme.

If desired, the kaolin filter cake can be treated again with more Tris buffer solution to remove any remaining adsorbed dextranase.

The resulting solution, which retains a pH of about 8.5, is treated with about 2 weight percent of wet DEAE cellulose which has been preequilibrated by being allowed to stand in 0.02M "Tris" buffer (pH8.5), and then filtered. The enzyme solution and the DEAE cellulose are mixed thoroughly and stirred for one hour. The mixture is then filtered, and the filter residue is washed with "Tris" buffer solution having a pH of 8.5. If desired, the enzyme solution can be treated a second time with fresh DEAE cellulose as described above to collect any residual dextranase remaining in solution.

The DEAE cellulose filter cake is resuspended in a solution containing about 0.3 mole of sodium chloride and 0.05 mole of "Tris" buffer per liter, to provide a pH of 8.5 to the solution.

This mixture is stirred for one hour in order to assure complete elution of the bonded enzyme from the DEAE cellulose, and filtered. The filter cake is washed with the same sodium chloride-"Tris" buffer solution. The filtrate contain the dextranase.

Six hundred grams of solid ammonium sulfate per liter of filtrate present are added to bring the filtrate to 85 percent saturation. After standing for about 10 hours, the dextranase enzyme is observed as a precipitate. The precipitate is collected by centrifugation or filtration.

Alternatively, the above filtrate from the DEAE cellulose containing mixture can be precipitated with acetone centrifuged or filtered.

The resulting filter residue which comprises a mixture of the purified enzyme and salts can be dissolved in a minimum amount of distilled water. If small amounts of distilled water are used, some remaining impurities such as pigment remain insoluble and can be centrifuged out to provide a clear supernatant liquid. The supernatant is then dialyzed against several changes of distilled water and filtered through a Millipore filter (0.45 microns) to remove bacterial contaminents.

Following this, if desired, the purified enzyme solution can be freeze-dried to yield a solid product. The enzyme is also useable in solution form as that obtained by the above process.

The purified products of this application can have a dextranase activity which is many times greater than the dextranase activity of the conventional prior art dextranase preparations, e.g., 2,500 to 6,000 units per mg.

EXAMPLE 2

Generally similar results are obtained upon substitution of acrylamide gel or TEAE cellulose for the DEAE cellulose in the experiment of example 1.

The dextranase unit is defined in accordance with the following test:

The following reagents are prepared: Reagent No. 1 consists of 12.5 grams of grade 2P dextran obtained from the Pharmachem Corporation, dissolved in 300 ml. of warm distilled water. After cooling to 10° to 15° C., 400 mg. of sodium borohydride dissolved in 15 ml. of cold water are added. After standing at the above temperature for about 12 hours, 7.2 grams of sodium acetate dissolved in 50 ml. of water are added, and sufficient glacial acetic acid is added to adjust the pH to 5. Water is then added to make 500 ml. of solution.

Reagent No. 2 is prepared by dissolving 28 grams of anhydrous disodium phosphate and 40 grams of Rochelle salt in 700 ml. of water. One hundred ml. of normal sodium hydroxide are added, followed by 80 ml. of a 10 percent copper sulfate solution, with stirring. One hundred and eighty grams of anhydrous sodium sulfate are then added and stirred to dissolve. Following this, water is added to make 1 liter of solution, and after standing overnight the solution is filtered.

Reagent No. 3 is made by dissolving 25 grams of ammonium molybdate and 450 ml. of water and adding 21 ml. of concentrated sulfuric acid. Following mixing, 3 grams of $Na_2HAsO_4 \cdot 7H_2O$ dissolved in 25 ml. of water are added and allowed to incubate at 37° C. for 1 to 2 days.

A few milligrams (e.g. 4.8 mg.) of the dextranase preparation to be assayed for dextranase activity are dissolved in 250 ml. of water. One ml. (e.g. 0.0192 mg.) of this enzyme solution plus 4 ml. of water are allowed to equilibrate at 40° C. for about 6 minutes. Ten ml. of Reagent No. 1 are added to the above prepared enzyme solution, mixed, and a 1 ml. sample withdrawn immediately and added to 1 ml. of Reagent No. 2. This is the zero time sample.

The remaining mixture is incubated for 20 minutes at 40° C., after which 1 ml. is withdrawn and added to 1 ml. of Reagent No. 2 to constitute a second sample. Both samples are then heated for 20 minutes in a boiling water bath and cooled to room temperature.

1 ml. of Reagent No. 3 is added to each sample and mixed, being allowed to stand for 5 minutes. The samples are diluted to 25 ml., and the Klett values determined with a 54 filter in a Klett spectrophotometer. The difference in Klett values in the two samples is divided by 760 (the Klett value obtained with a 54 filter for a solution containing 1 mg. of isomaltose per ml.) and then multiplied by 45 (a combined dilution and time factor) to obtain the number of dextranase units present in each sample. This value is divided by the milligrams of enzyme preparation in each sample (e.g. 0.0192 mg.) to yield the dextranase activity units per milligram of enzyme preparation.

The above disclosure is offered for purposes of illustration only rather than for purposes of limitation of the scope of the invention.

What is claimed is:

1. The process of purifying dextranase in an impure liquid mixture which comprises: combining said mixture at a pH of 3.5 to 6 with clay to adsorb dextranase; separating said clay from the liquid mixture; combining said clay with an aqueous wash solution having a pH of 7 to 9 to desorb said dextranase; separating said wash solution from said clay; combining said wash solution with an insoluble material selected from the group consisting of carbohydrate anionic exchange materials having active groups selected from the class consisting of tertiary amine and quaternary ammonium groups to absorb said dextranase, and acrylamide gels; separating said insoluble material from said wash solution; and eluting dextranase from said insoluble material.

2. The process of claim 1 in which said insoluble material is a carbohydrate anionic exchange material.

3. The process of claim 2 in which said anionic exchange material is washed with a saline solution to elute dextranase.

4. The process of claim 2 in which said clay is kaolin.

5. The process of claim 2 in which said anionic exchange material is cellulose containing pendant tertiary alkyl amine active groups.

6. The process of claim 5 in which said anionic exchange material is (diethylamino)ethyl cellulose.

7. The process of claim 4 in which said liquid mixture is at a pH of 4.5 to 5 and a temperature of 65° to 75° F. prior to combining with the clay.

8. The process of claim 7 in which said aqueous wash solution has a pH of 8 to 9 immediately prior to combining with the clay.

9. The process of claim 5 in which said aqueous wash solution has a pH of from 6.5 to 9.5 immediately prior to combining with said anionic exchange material.

10. The process of claim 9 in which said pH is 8 to 9.

11. The process of claim 10 in which said dextranase is eluted from the anionic exchange material by suspending said material in an aqueous salt solution at a pH of 8 to 9.

12. The process of claim 2 in which said impure liquid mixture is derived from a culture broth of *Penicillium funiculosum*.

13. The process of claim 12 in which said impure liquid mixture is combined at a pH of 4.5 to 5 with kaolin, said kaolin being thereafter separated therefrom by filtering; and said kaolin is thereafter combined with aqueous wash solution at a pH of 8 to 9; and the wash solution is separated from the kaolin and combined with (diethylamino)ethyl cellulose.

14. The process of claim 1 in which said insoluble material is an acrylamide gel.

\* \* \* \* \*